US005907149A

United States Patent [19]
Marckini

[11] Patent Number: 5,907,149
[45] Date of Patent: May 25, 1999

[54] IDENTIFICATION CARD WITH DELIMITED USAGE

[75] Inventor: Eugene F. Marckini, Weston, Mass.

[73] Assignee: Polaroid Corporation, Cambridge, Mass.

[21] Appl. No.: 08/266,977

[22] Filed: Jun. 27, 1994

[51] Int. Cl.[6] .......... G06K 19/00
[52] U.S. Cl. .......... 235/487; 235/380; 235/454
[58] Field of Search .......... 235/380, 382.5, 235/454, 487

[56] References Cited

U.S. PATENT DOCUMENTS

| | | | |
|---|---|---|---|
| 3,581,282 | 5/1971 | Altman . | |
| 3,805,238 | 4/1974 | Rothfjell . | |
| 4,092,526 | 5/1978 | Beck | 235/419 |
| 4,151,667 | 5/1979 | Idelson et al. . | |
| 4,587,410 | 5/1986 | Milnes | 235/382.5 |
| 4,598,196 | 7/1986 | Pierce et al. . | |
| 4,636,622 | 1/1987 | Clark | 235/380 |
| 4,692,394 | 9/1987 | Drexler . | |
| 4,972,476 | 11/1990 | Nathans | 235/380 |
| 5,189,288 | 2/1993 | Anno et al. . | |
| 5,218,528 | 6/1993 | Wise et al. . | |
| 5,371,345 | 12/1994 | LeStrange | 235/382.5 |
| 5,500,513 | 3/1996 | Langhans | 235/380 |

FOREIGN PATENT DOCUMENTS

| | | |
|---|---|---|
| 0247788 | 12/1987 | European Pat. Off. . |
| 2173973 | 4/1986 | United Kingdom . |
| 2173970 | 10/1986 | United Kingdom . |

OTHER PUBLICATIONS

D.E. Raphael and J.R. Young, *Automated Personal Identification*, Stanford Research Institute, Dec. 1974.

Polaroid Procuct Brochure FT407Z, *The New Polaroid Identification System*, Jul. 1966.

*Primary Examiner*—Harold I. Pitts
*Attorney, Agent, or Firm*—Renato M. de Luna

[57] ABSTRACT

The present invention particularly provides an identification card and an access system for its use. The identification card has recorded thereon visually-readable bearer information and encoded machine-readable data. The encoded machine-readable data includes encoded data representative of a personal identifier of the bearer and encoded data representative of at least one event or transaction. When used in the access system, the identification card is scanned by an information processing apparatus. When the bearer of the identification card presents a personal identifier to the information processing apparatus, the presented personal identifier is analyzed and compared with the encoded personal identifier data. If there is an acceptable correlation between the presented personal information and the encoded personal identifier data, and if there is a determination that access would not exceed a predetermined number of permissible occurrences, access is effected. Subsequent to the provision of such access, or contemporaneously with presentment, the encoded machine-readable data is altered to record the provision of such access.

8 Claims, 2 Drawing Sheets

IDENTIFICATION CARD WITH DELIMITED USAGE

FIELD OF THE INVENTION

In general, the present subject matter relates to identification cards and to an access system employing such identification cards to verify a bearer's identity and to determine the existence of prior event-related or transactional occurrences. Particular applications of the present subject matter are directed to voter identification cards and voting access systems.

BACKGROUND OF THE INVENTION

It is common practice to regulate access to events (or participation in transactions) to authorized individuals. In this regard, several systems have been implemented whereby proof of individual identity is utilized for determining authorization for said access. For certain events, proof of identity is the only requirement for access. Several current identification systems operate sufficiently to satisfy such requirement. For other events, however, access systems (and the selectivity associated therewith) will benefit from automated regulation on the further basis of prior event-related occurrences. While desirable, automated access systems are not known wherein regulated access based on the dual determination of both identity and prior event-related occurrences is achieved satisfactorily, i.e., without incurring problems seemingly inherent in such system. To illustrate such problems, reference may be made to one useful application of an access system, i.e., elections.

In conducting an election, a traditional method for regulating the access of voters to, for example, voting booths is to physically screen and intercept voters as they enter the voting arena. At that time, voting personnel will typically verify that each voter's name is on a master list of registered voters and that the voter has not already voted in that election. This manual verification and certification process is slow, potentially inaccurate, and not easily disposed to practical and efficient automation. Drawbacks—seemingly more pronounced in automated access systems, in general—are manifest. First, it will be appreciated that the security of an access system (automated or manual) based solely on identity verification is often easily circumvented. Second, despite advantage, the addition of a further determinative access parameter relating to the occurrence of prior events frustrates and complicates the design of a practical automated access system.

A desirable goal in the design of an automated access system would be to maximize access while minimizing opportunity for circumventing the system's access parameters. In this regard, for the several applications envisioned for the present system, access should be generally provided based on the principles that (1) an event or transaction should be attended only by an authorized individual; and (2) the event or transaction should be attended only for a predetermined number of occasions. Further, it should be recognized that (1) overlong screening processes generally increase the opportunity for circumvention, and accordingly, an access system should be sufficiently efficient to thereby promote expedient processing; and (2) telecommunication lines—and other means of sharing information across geographical distances—are either non-existent, limited, or poorly developed in those areas where the access system may be foreseeably implemented.

SUMMARY OF THE INVENTION

The present invention is directed toward effecting selective access to events or transactions, the events or transactions being restricted by both identity and prior access-related and transactional occurrences, for example, voting and elections, the collection of personal government benefits or entitlements, restricted cafeteria or dining hall meals, and the like.

According to a product aspect of the present invention, there is provided an identification card (or other equivalent member) having visually-readable information and encoded machine-readable data. The encoded machine-readable data includes data representative of a personal identifier (preferably biometric) of the bearer. The encoded machine-readable data also includes encoded data representative of at least one event or transaction. The identification card is used for presentment in gaining access to an event or transaction, wherein eligibility of the bearer to access to the event or transaction is determined by presentment of the card for machine-reading and recognition of the encoded machine-readable data. To delimit the usage of the identification card, the encoded event-related or transactional data is alterable for recordation of the expiry of eligibility of the card bearer to access the event or transaction. In embodiments of the identification card, each event or transaction encoded on the card has a predetermined number of possible occurrences.

According to method aspects of the present invention, a data holding article, such as the aforementioned identification card, is machine-read (cf., scanned) by a "stand-alone" information processing apparatus for comparison with information presented by the bearer of the data card. The information processing apparatus will effect (cf., actuate) access to an event or (participation in) a transaction when the apparatus makes an acceptable bearer identification determination and determines prior events or transactions within the predetermined number of permissible occurrences. The information processing apparatus effects a bar (passively or actively) to an event or transaction when the apparatus makes an unacceptable bearer identification determination or determines that such access (or participation) would exceed a predetermined number of permissible occurrences. In either instance, the identification determination is made in consideration of predetermined bearer identification requirements, the requirements being effected by the degree of selectivity desired. After access is effected, the event-related or transactional data pertaining to the accessed event or transaction is burned, punched out, destroyed, or the data holding article is otherwise altered to reflect the provision of access.

In consideration of the above, it is an object of the present invention to provide an identification card having recorded thereon machine-readable data including encoded data representative of a personal identifier (preferably biometric) of a bearer and encoded event-related or transactional data representative of at least one event or transaction.

It is another object of the present invention to provide an access system capable of determining access to an event or transaction on an "on-site", "stand-alone" basis, i.e., without critical functional reliance on an external, centralized information storage and processing system and connection thereto.

It is another object of the present invention to provide a "stand-alone", automated access system capable of "on the spot" identification and "on the spot" determination and recordation of prior event-related or transactional occurrences.

It is another object of the present invention to provide a "stand-alone", automated access system, the access system utilizing an information processing apparatus capable of reading encoded data representative of a personal identifier of a bearer for comparison with information transduced from analysis of a corresponding personal identifier presented by the bearer.

It is another object of the present invention to provide a "stand-alone", automated access system, the access system utilizing an information processing apparatus capable of reading encoded data representative of an event or transaction.

It is another object of the present invention to provide a "stand-alone", automated event access system wherein access to an event or transaction is effected as a function of determinations relating to both bearer identification and to prior event-related or transactional occurrences.

It is another object of the present invention to provide a "stand-alone", automated event access system capable of recording onto a data holding article the provision of access to an event or transaction subsequent to or contemporaneously with the provision of access or the occurrence of the event or transaction.

It is another object of the present invention to provide an identification card for presentment in gaining access to an event or transaction, the identification card comprising: a substrate having recorded thereon visually-readable information representative of a bearer of the card; and machine-readable data; the machine-readable data including (a) encoded data representative of a personal identifier of the bearer, and (b) encoded data representative of at least one event or transaction; eligibility of the bearer to access to the event or transaction being determinable by presentment of the identification card for machine-reading and recognition of the machine-readable data; the event-related or transactional data on the identification card being alterable for recordation of the expiry of eligibility of the card bearer to access the event or transaction.

It is another object of the present invention to provide an access system for determining access to an event or transaction for a bearer of a data holding article, the bearer having a personal identifier, access to the event or transaction being dependent on the satisfaction of predetermined bearer identification requirements and the existence of prior occurrences, the method employing the data holding article and an information processing apparatus; the method comprising the steps of: providing a data holding article, the data holding article having recorded thereon machine-readable data, the machine-readable data including encoded data representative of a bearer's personal identifier, the machine-readable data including encoded data representative of at least one event or transaction, each event or transaction having a predetermined number of permissible occurrences; providing information processing apparatus, the information processing apparatus having means for reading the encoded event-related or transactional data, the information processing apparatus having means for reading the encoded personal identifier data, the information processing apparatus having input means for receiving a personal identifier presented by the bearer, the presented personal identifier being correspondent with the encoded personal identifier data, the information processing apparatus having means for computing correlation between the encoded personal identifier data and the presented personal identifier; presenting the data holding article to the information processing apparatus, the information processing apparatus reading the encoded personal identifier data, the information processing apparatus reading the encoded event-related or transactional data for a determination of prior occurrences; presenting the bearer's personal identifier to the information processing apparatus, the information processing apparatus computing the correlation between the presented personal identifier and the encoded personal identifier data for a determination of bearer identity; and (a) the information processing apparatus effecting a bar to the event or transaction when the correlation between the presented personal identifier and the encoded personal identifier data is inconsistent with the predetermined bearer identification requirements or when there is a determination that access would exceed the predetermined number of permissible occurrences, and (b) the information processing apparatus effecting access to the event or transaction when the correlation between the presented personal identifier and the encoded personal identifier is consistent with the predetermined bearer identification requirements and when there is a determination of prior events or transactions within the predetermined number of permissible occurrences, the information processing apparatus altering the data holding article to record the access, the recordation being machine-readable by the information processing apparatus for the determination of prior occurrences.

These and other advantages of the invention, as well as details relating to the practice of the invention, will be better appreciated from the following detailed description construed with consideration of the attached drawings.

DETAILED DESCRIPTION OF THE INVENTION

The present invention provides an identification card that may be used, for example, in verifying the identity of its bearer and promptly determining the existence of prior event-related or transactional occurrences. Utilized in an appropriate access system—one such system also being provided by the present invention—the identification card effects (cf., actuates) access to an event or transaction on the basis of both identity and prior event-related or transactional occurrences. The identification card is designed to be alterable for recordation of the eligibility of a card bearer to access an event or transaction. Accordingly, once access to an event or transaction is effected, the identification card is subsequently or contemporaneously altered to record such access. For certain events or transactions, the alteration is preferably effected with the objective of making the reversibility of such registration difficult.

For the purposes of the present description, the terminology "event or transaction" shall be used as a singular construct embodying the meanings of both words. "Access" to an "event or transaction" will involve, for example, the unlocking or locking of a door, gate, or other like physical barrier; the sounding or silencing of a buzzer; the illumination or turning off of a light source; the continuation or discontinuation of a computer program; and the activation or deactivation of an alarm system.

With regard to the identification card's structure, a card is provided having thereon visually-readable bearer indicia and machine-readable data. Prior to the identification card's first use, the machine-readable data includes (a) encoded data representative of a personal identifier of the bearer and (b) event-related or transactional data representative of at least one event or transaction. In particular embodiments, each event or transaction encoded has a predetermined number of permissible occurrences.

While described herein configured as a planar card (analogous to common, "wallet-sized" identification cards, credit cards, and the like), other configurations are contemplated, the variations thereof subsisting, for example, on the nature of an event or transaction and the selectivity of the access thereto. Pass keys, tablets, disks, and the like, are representative alternative configurations. When used for providing selective access to political election events, the planar card format comprising a substrate is a practical configuration. The substrate may be manufactured from materials such a paper; metal; and plastics, such as poly (vinyl chloride) and polyethylene terephthalate.

Figure 1:
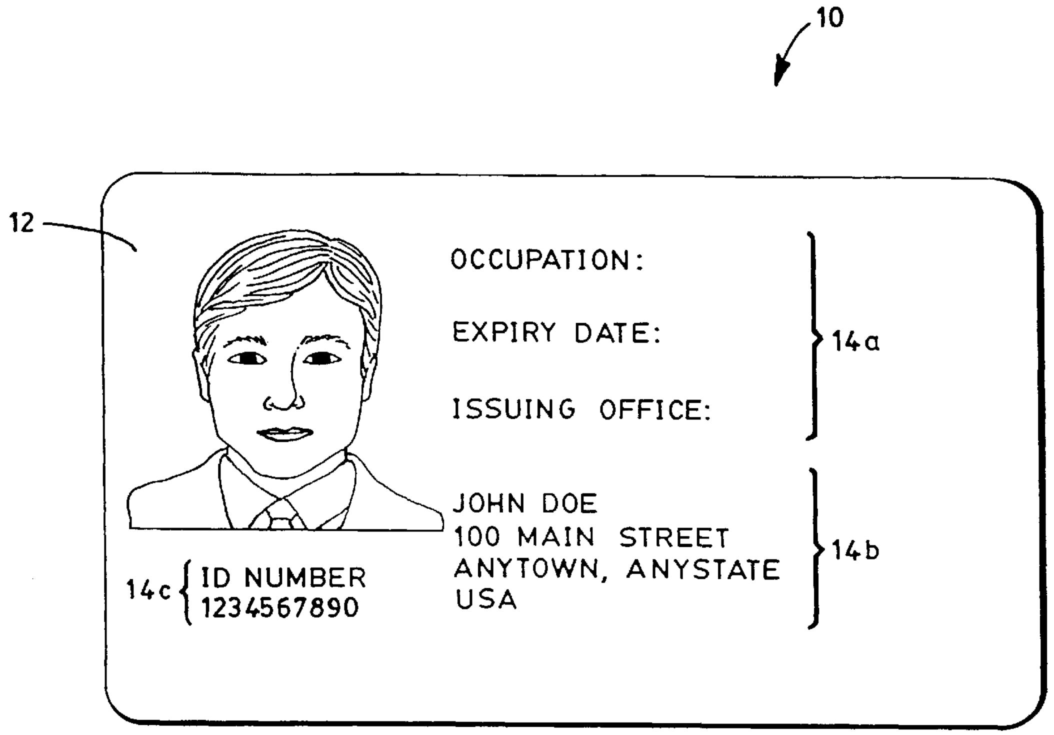
FIG. 1 of the drawings schematically illustrates a front side of an embodiment of an identification card according to a product aspect of the present invention, the identification card being useful in method aspects of the present invention.
Figure 2:
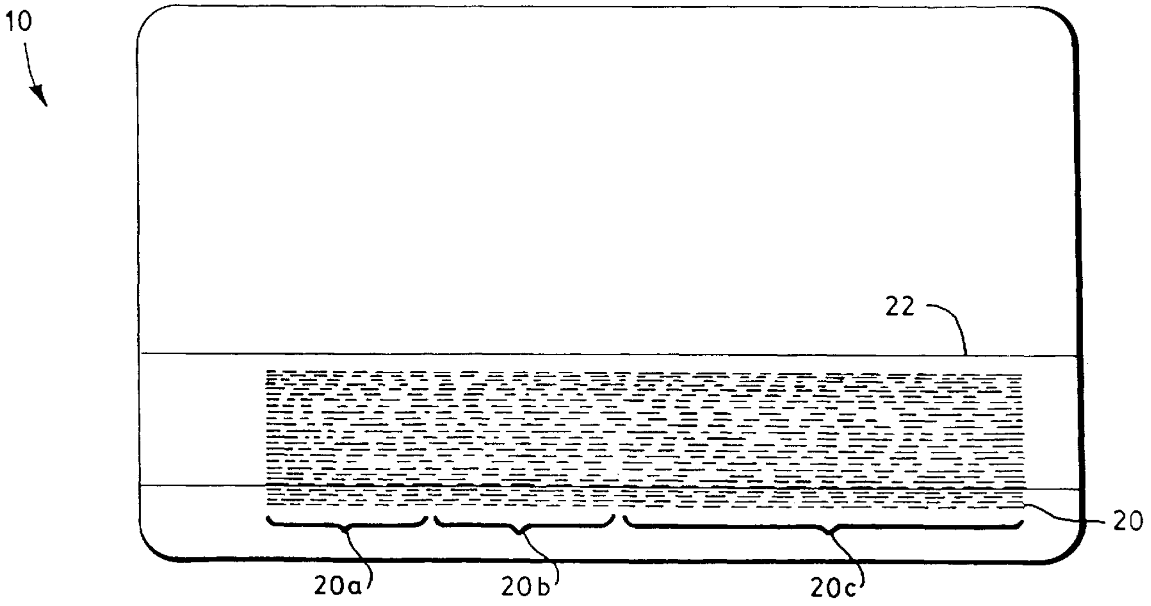
FIG. 2 of the drawings schematically illustrates a reverse side of the identification card illustrated in FIG. 1.

An embodiment of an identification card according to a product aspect of the present invention is provided in FIGS. 1 and 2.

FIG. 1 of the drawings illustrates an identification card 10 having thereon the bearer's picture 12 and various other bearer and event or transaction related indicia or information 14*a*, 14*b*, and 14*c*, the picture and information being visually-readable. As used herein, the term "visually-readable" information refers to formats that may be visualized by an individual with immediate and useful comprehension of the functional information conveyed thereby. Encoding (or enciphering) is not involved. In contrast, "machine-readable" data (encoded or enciphered)—while potentially visualizable—cannot be usefully comprehended by an individual without the use of a suitable device, machine, or apparatus. Although not critical to the inventive aspects of the subject matter disclosed herein, examples of visually-readable indicia useful for a voter card, for example, include demographic-related information (such as found in indicia 14*a*), bearer residential information (such as found in indicia 14*b*), and an identification number (such as found in indicia 14*c*).

The reverse side of identification card 10 is illustrated in FIG. 2. While the identification card 10 illustrated in FIGS. 1 and 2 displays the card's components on both the front and rear sides at specific locations, it will be appreciated that such components may be positioned in several other locations on the card. An identification card with its components situated on a single side is contemplated.

As shown in FIG. 2, the rear side of identification card 10 has thereon disposed data site 20. While the identification card 10 presented in FIGS. 1 and 2 illustrates machine-readable data embodied as a discrete, localized data site 10, it will be appreciated that equivalent embodiments of the identification card may incorporate machine-readable data in other formats and configurations. For example, it is envisioned that machine-readable data may be incorporated into several regions of an identification card, rather than in a single region. It is also envisioned that machine-readable data may be encoded in a configuration which cannot be discerned by unaided (and/or casual) visual inspection.

As schematically shown, machine-readable data site 20 is a high-density bar code. To prevent photoreproduction of bar code 20, an anti-photocopying stripe 22 may be positioned substantially correspondent with (cf., superposed over or integrated into) bar code 20, the stripe 22 being functionally transparent for optical bar code readers yet reflective of conventional photocopier exposure irradiation. Other means of preventing unauthorized duplication will be known to those skilled in the art in view of the present disclosure.

The configuration with which machine-readable data is disposed on the identification card can be selected from any information recording configuration with which data may be stored and retrieved for future reference and comparison. Examples of such configurations include optical media, magnetic media, bar codes, and the like. When the identification card is to be used as a single-use voter card encoding a single event or transaction having a single permissible occurrence (or a voter card encoding a plurality of events or transactions, each event or transaction having a single permissible occurrence), security benefits are enhanced by selection of a "read only" configuration with post-access alteration being accomplished by the destruction of the portion representative of the pertinent event or transaction. It will be appreciated that advantage in general will be gained by the selection of a configuration that may be easily altered upon the occurrence of an appropriate event or transaction. In one embodiment, desirable results are achieved by the use of a high density, "bar code"-type configuration. Such bar code may be printed (or imaged) directly on the identification card 10, or printed (or imaged) onto a label or insert, the label or insert being affixed onto or laminated together with the card.

For certain events or transactions requiring highly selective screening, the encoded personal identifier data recorded onto identification card 10 should be selected in consideration of preventing use of the identification card by an unauthorized individual. In this regard, care must be exercised in the selection of memory-based or behavioral-based personal identifier. Memory-based and behavioral-based personal identifiers relate, for example, to memorized PINs (personal identification numbers), signatures, and voice exemplars.

In the context of elections, the use of PINs has the disadvantage that, in spite of all precautions, it is possible for an unauthorized person to obtain knowledge of a bearer's secret code number. For such reasons, the use of memorized personal code numbers is disfavored for highly restricted election-related events or transactions. In the same vein, attempts have also been made to use voice for automated identification. However, common among behavioral-based features, the characteristics of the human voice are not constant, and when used for automated identification purposes will not all times coincide sufficiently with a recorded voice exemplar. In view of such drawbacks, identification cards used for highly restricted voting events or transactions will preferably utilize biometric features for the personal identifier. Fingerprints (or palm prints) are particularly preferred.

When a fingerprint is selected for the personal identifier, the encoding thereof should take into consideration the data storage capabilities of the selected machine-readable data configuration. When the machine-readable data is configured as a bar code, the finger print data is preferably encoded as a digital map.

The basic idea underlying the algorithms common to digital mapping is to identify and locate unique points of the fingerprint commonly referred to as minutia. The two predominant types of minutia are ridge endings and bifurcations. A ridge ending is formed when a ridge of a fingerprint no longer continues along its path; it simply stops or ends.

A bifurcation on the other hand is formed when a ridge of a fingerprint splits (bifurcates) into two ridges or, conversely, when two ridges merge into one ridge. Fingerprint identification algorithms are concerned with identifying minutia of the fingerprint (both ridge endings and bifurcations) and associating with each minutia found, three positional identifiers (e.g., x, y, and theta). These three parameters are generally used to locate the minutia in an arbitrary (but fixed) cartesian coordinate system where x and y map the position of the minutia and theta defines its angle of orientation with respect to one of the axes. When incorporated into embodiments of the present invention, it is envisioned that the plot of three such parameters may be digitally encoded, for example, in an area of a bar code (e.g., area 20*a* or 20*b* in FIG. 2) separate from, for example, an area encoding the event-related and transactional data (e.g., area 20*c* in FIG. 2). Details of this and other fingerprint processing apparatus are known. Further discussion is found in, for example, U.S. Pat. Nos. 5,230,025; 5,239,590; 5,241,606; and 5,224,174.

In addition to the identification card, the present invention provides an automated system for effecting access to an event or transaction by the bearer of a data holding article, such as the aforedescribed identification card. In the access system, access to the event or transaction is dependent on both bearer identification and prior event-related or transactional occurrence. The method more particularly employs a data holding article and an information processing apparatus. The data holding article has encoded thereon machine-readable data, the encoded data including data representative of a personal identifier (preferably biometric) of the bearer and encoded data representative of at least one event or transaction.

The information processing apparatus used in the access system has means for reading the encoded personal identifier data. The information processing apparatus also has input means for receiving a personal identifier presented by the bearer and means for computing the correlation between the encoded personal identifier data and the presented personal identifier.

In the operation of the information processing apparatus, the bearer of the data holding article is prompted to present his or her card to the information processing apparatus (e.g., inserting the card into a reader), and prompted to present a correspondent personal identifier (e.g., placing thumbprint on a scanner or inputing a code number into a keyboard). The information processing apparatus both compares the presented personal identifier with the encoded personal identifier data for the determination of bearer identification and reads the encoded event-related or transactional data for the determination of pertinent prior event-related or transactional occurrences.

The information processing apparatus effects a bar to an event or transaction when there is an unacceptable bearer identification determination or when there is a determination that access would exceed a predetermined number of permissible occurrences. The information processing apparatus effects access to an event or transaction when there is an acceptable bearer identification determination and a determination of pertinent prior events or transactions within the predetermined number of permissible occurrences. Whether an identification determination is acceptable or unacceptable is generally decided with reference to predetermined bearer identification requirements. A determination is unacceptable if the machine-computed correlation between the presented personal identifier and the encoded personal identifier data is inconsistent with (does not match, or does not satisfy) the predetermined bearer identification requirements. A determination is acceptable if the machine-computed correlation between the presented personal identifier and the encoded personal identifier data is consistent with (matches, or satisfies) the predetermined bearer identification requirements.

If access is effected, the information processing apparatus alters the data holding article to record the provision of said access, the alteration being machine-readable by the apparatus for subsequent determination of prior occurrences. In certain embodiments, the alteration of the data holding article is accomplished by altering the encoded event-related or transactional data representative of the accessed event or transaction. In certain embodiments, alteration is accomplished by destruction of the pertinent encoded event-related or transactional data.

Figure 3:
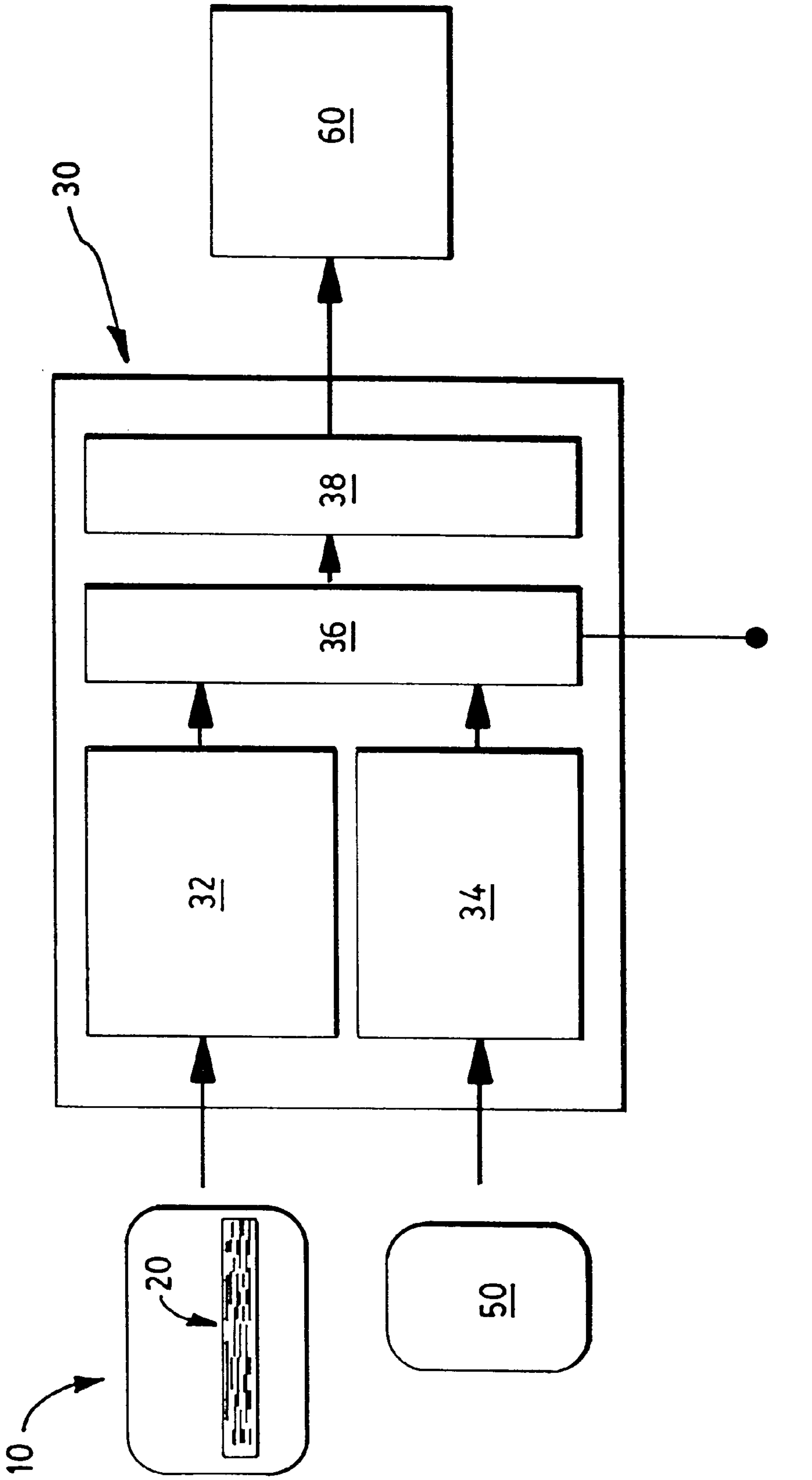
FIG. 3 is a representational block drawing schematically illustrating the components of an apparatus which may be used, preferably together with the identification card of FIG. 1, in method aspects of the present invention.

FIG. 3 sets forth a representational block drawing schematically illustrating the components of one possible apparatus that would provide similar functionality as the aforedescribed information processing apparatus. It will be appreciated that the inventive aspects of the subject matter described herein subsists in an unprecedented combination of elements and steps, particular elements and steps being known in the art. Accordingly, the design illustrated in FIG. 3 (and related description following herein) is provided primarily for reference to facilitate presentation and understanding of the combination. Details, modifications, and alternatives thereto consistent with the invention will be clear to one skilled in the art in view of the present disclosure.

As illustrated, information processing apparatus 30 will contain an encoded data reader 32 and a presented personal identifier reader 34. Data reader 32 provides means for reading the machine-readable data 20 of identification card 10, the machine-readable data 20 comprising encoded personal identifier data and encoded event-related or transactional data. Examples of data readers include magnetic strip readers, bar code readers, optical scanners, and the like. Presented personal identifier reader 34 provides input means for receiving a personal identifier 50 presented by the bearer. Personal identifier readers which may be considered for incorporation and use in the information processing apparatus are disclosed, for example, in U.S. Pat. Nos. 3,581,282 (palm print); 3,805,238 (facial body curves); 5,291,560 (iris analysis); 5,239,590 (fingerprint). For systems utilizing PINs for the personal identifier, a computer keyboard may be selected as the personal identifier reader. If voice identification is utilized, a microphone could be implemented. Several other personal identifier readers may be found in the art.

For systems utilizing a fingerprint for the personal identifier, a suitable personal identifier reader may be provided, for example, comprising a transparent platen and an array of photodiodes. A fingerprint can be pressed against such platen and scanned by an interrogating beam of collimated light in the form of, for example, a slit that is linearly displaced across the platen. As the reflected light beam is scanned across the back surface of the platen, the reflected light beam is modulated. The modulated beam is then imaged onto the array of photodiodes to provide a series of output signals indicative of the modulation information.

Output from the data reader 32 and personal identifier reader 34 are compared by comparator 36, such as an internal CPU or other like semiconductor chip-based device. In essence, comparator 36 provides means for computing correlation between the encoded personal identifier data and the presented personal identifier based on the signals received from their respective readers, 32 and 34. If comparator 36 calculates that the output is inconsistent with pertinent predetermined requirements for identity and prior event-related or transactional occurrences, a bar is effected. If comparator 36 calculates that the output from readers 32 and 34 is consistent with both predetermined requirements, access to event 60 is effected.

It will be appreciated that the information processing apparatus 30 operates as a "stand-alone" (or "self-contained") unit. In this regard, it will be noted that the functionalities provided by the apparatus are independent of an external centralized data base. Reading information, comparing information, and modifying information occur within the unit. Regardless, the terms "self-contained" or "stand-alone" should not be construed as indicating that all components are housed in a single enclosure, housing, cabinet, or the like. Rather, the term should be broadly construed in terms of a capacity to function disconnected from a networked system wherein data is stored centrally and peripherally shared by several outside terminals. The "stand-alone" feature provides benefits in portability and operability beyond the extent of existing telecommunication lines as well as enhancing the speed with which access determinations are made.

In accord with particular embodiments, subsequent to the provision of access to event or transaction 60, encoded machine-readable data 20 is altered by record modification means 38 to record the provision of said access to event or transaction 60. According to the invention, the alteration is machine-readable by the information processing apparatus for the determination of prior occurrences. In particular embodiments, alteration is accomplished by destruction of pertinent portions of the encoded machine-readable data. Such destruction is a machine-readable alteration to the extent that the information processing apparatus recognizes the absence of the encoded machine-readable data so destroyed, and continues to function in accordance with the invention.

It will be appreciated that it is not critical to the practice of the invention that alteration by record modification means 38 occur immediately subsequent to the provision of access to event or transaction 60. Alteration generally transpires contemporaneously with the presentment of the data holding article. It is envisioned that for certain applications alteration by record modification means 38 may transpire relatively long after occurrence of event or transaction 60, but nevertheless prior to a second usage of the identification card 10.

Several means may be implemented for altering the encoded event-related or transactional data on a data holding article. For events or transactions involving a single permissible occurrence, a voting event for example, destruction of the portion of the encoded machine-readable data corresponding to the encoded event-related or transactional data is preferred, means therefor involving punching, burning, die stamping, embossing, and the like. For data holding articles used for multiple events or transactions, each event involving a single permissible occurrence, the encoded event-related or transactional data pertinent to the accessed event or transaction is destroyed, leaving pertinent portions of the encoded machine-readable data readable for subsequent use. It will be appreciated that machine-readable data configured as bar codes are well suited for such functionality.

For machine-readable data encoded on magnetic media, the encoded data may be altered by conventional overwriting processes. For machine-readable data encoded on optical recording media, the encoded data may be altered, for example, by a light beam changing the optical characteristics of the optical recording media. When the machine-readable data is encoded on a preformatted, exposed, and developed film having clear transmissive or black opaque areas, alteration may be accomplished, for example, by either bleaching or darkening processes. Although several record modification means are contemplated, it is reemphasized that for strictly restricted events or transactions the alteration should be accomplished with the objective of making difficult the reconstruction of altered encoded machine-readable data.

While the present invention has been shown and described by reference to certain embodiments, it will be appreciated that many changes and modifications may be made therein by one skilled in the art in view of the present disclosure without departing from the essential spirit of the invention as defined in the following claims.

I claim:

1. An access system for determining access to an event or transaction for a bearer of a data holding article, the bearer having a personal identifier, access to the event or transaction being dependent on the satisfaction of predetermined bearer identification requirements and the existence of prior occurrences, the method employing the data holding article and an information processing apparatus; the method comprising the steps of providing a data holding article, the data holding article having recorded thereon machine-readable data, the machine-readable data including encoded data representative of a bearer's personal identifier, the machine-readable data including encoded data representative of at least one event or transaction, each event or transaction having a predetermined number of permissible occurrences;

providing information processing apparatus, the information processing apparatus having means for reading the encoded event-related or transactional data, the information processing apparatus having means for reading the encoded personal identifier data, the information processing apparatus having input means for receiving a personal identifier presented by the bearer, the presented personal identifier being correspondent with the encoded personal identifier data, the information processing apparatus having means for computing correlation between the encoded personal identifier data and the presented personal identifier;

presenting the data holding article to the information processing apparatus, the information processing apparatus reading the encoded personal identifier data, the information processing apparatus reading the encoded event-related or transactional data for a determination of prior occurrences;

presenting the bearer's personal identifier to the information processing apparatus, the information processing apparatus computing the correlation between the presented personal identifier and the encoded personal identifier data for a determination of bearer identity; and a) the information processing apparatus effecting a bar to the event or transaction when the correlation between the presented personal identifier and the encoded personal identifier data is inconsistent with the predetermined bearer identification requirements or when there is a determination that access would exceed the predetermined number of permissible occurrences, and b) the information processing apparatus effecting access to the event or transaction when the correlation between the presented personal identifier and the encoded personal identifier is consistent with the predetermined bearer identification requirements and when there is a determination of prior events or transactions within the predetermined number of permissible occurrences, the information processing apparatus altering the data holding article to record the access, the recordation being machine-readable by the information processing apparatus for the determination of prior occurrences.

2. The access system of claim 1, wherein the predetermined number of permissible occurrences for each event or transaction is 1, whereby the access system is useful for effecting voting access.

3. The access system of claim 1, wherein the personal identifier is biometric.

4. The access system of claim 3, wherein the encoded biometric data representative of an identifying biometric feature of the bearer comprises encoded fingerprint information.

5. The access system of claim 3, wherein the personal identifier is a fingerprint.

6. The access system of claim 5, wherein the alteration of the data holding card is accomplished by altering the encoded event-related or transactional data representative of the event or transaction.

7. The access system of claim 6, wherein the encoded event-related or transactional data is altered by destroying the event-related or transactional data representative of the event or transaction.

8. The access system of claim 1, wherein the alteration of the data holding card is accomplished by altering the encoded event-related or transactional data representative of the event or transaction.

* * * * *